(12) United States Patent
Malik

(10) Patent No.: US 8,739,201 B2
(45) Date of Patent: May 27, 2014

(54) SYSTEM AND METHOD OF DELIVERING ADVERTISEMENT DATA TO A MOBILE DEVICE

(75) Inventor: Dale Malik, Dunwoody, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 952 days.

(21) Appl. No.: 12/181,076

(22) Filed: Jul. 28, 2008

(65) Prior Publication Data

US 2010/0023965 A1    Jan. 28, 2010

(51) Int. Cl.
| | |
|---|---|
| H04N 7/10 | (2006.01) |
| H04N 7/16 | (2011.01) |
| H04N 7/025 | (2006.01) |
| H04N 5/445 | (2011.01) |
| G06F 3/00 | (2006.01) |
| G06F 13/00 | (2006.01) |

(52) U.S. Cl.
USPC .............................. 725/32; 725/38; 725/135

(58) Field of Classification Search
USPC ............................................ 725/32, 38, 135
See application file for complete search history.

(56) References Cited

U.S. PATENT DOCUMENTS

| | | | |
|---|---|---|---|
| 6,799,327 B1 * | 9/2004 | Reynolds et al. ............... | 725/42 |
| 2002/0129362 A1 * | 9/2002 | Chang et al. ..................... | 725/32 |
| 2003/0159153 A1 * | 8/2003 | Falvo et al. ..................... | 725/110 |
| 2004/0203909 A1 | 10/2004 | Koster | |
| 2005/0086104 A1 | 4/2005 | McFadden | |
| 2005/0251823 A1 * | 11/2005 | Saarikivi ........................ | 725/42 |
| 2007/0094703 A1 * | 4/2007 | Nygaard et al. ................ | 725/38 |
| 2007/0157251 A1 | 7/2007 | Shrivastava et al. | |
| 2007/0196806 A1 | 8/2007 | Ljungman et al. | |
| 2007/0250847 A1 | 10/2007 | Gastwirth | |
| 2007/0282715 A1 | 12/2007 | Deas et al. | |
| 2008/0098450 A1 * | 4/2008 | Wu et al. ........................ | 725/132 |
| 2008/0109843 A1 * | 5/2008 | Ullah .............................. | 725/34 |
| 2008/0216107 A1 * | 9/2008 | Downey et al. ................ | 725/22 |
| 2009/0210899 A1 * | 8/2009 | Lawrence-Apfelbaum et al. .............................. | 725/34 |
| 2009/0239514 A1 * | 9/2009 | Kenagy et al. ................. | 725/34 |

* cited by examiner

*Primary Examiner* — Pankaj Kumar
*Assistant Examiner* — Randy Flynn
(74) *Attorney, Agent, or Firm* — Guntin & Gust, PLC; Ralph Trementozzi

(57) ABSTRACT

A method of delivering advertisement data to a mobile device includes receiving video content associated with an advertisement at a set-top box device via an access network of a video distribution system. The method also includes receiving an advertisement selection command at the set-top box device. The advertisement selection command indicates that data related to the advertisement is to be sent to a particular mobile device associated with the set-top box device. Further, the method includes sending an indication of the advertisement selection command to an advertisement data management system via the access network, in response to the advertisement selection command.

15 Claims, 11 Drawing Sheets

SYSTEM AND METHOD OF DELIVERING ADVERTISEMENT DATA TO A MOBILE DEVICE

FIELD OF THE DISCLOSURE

The present disclosure generally relates to communications networks, and more particularly relates to delivering advertisement data to a mobile device.

BACKGROUND

Television viewing is a common activity. Advertisements are commonly included with television content. A viewer may wish to respond to offers or events associated with advertisements in which the viewer is interested. Additionally, advertisers may desire to provide interested viewers with more information related to offers or events.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

Figure 1:
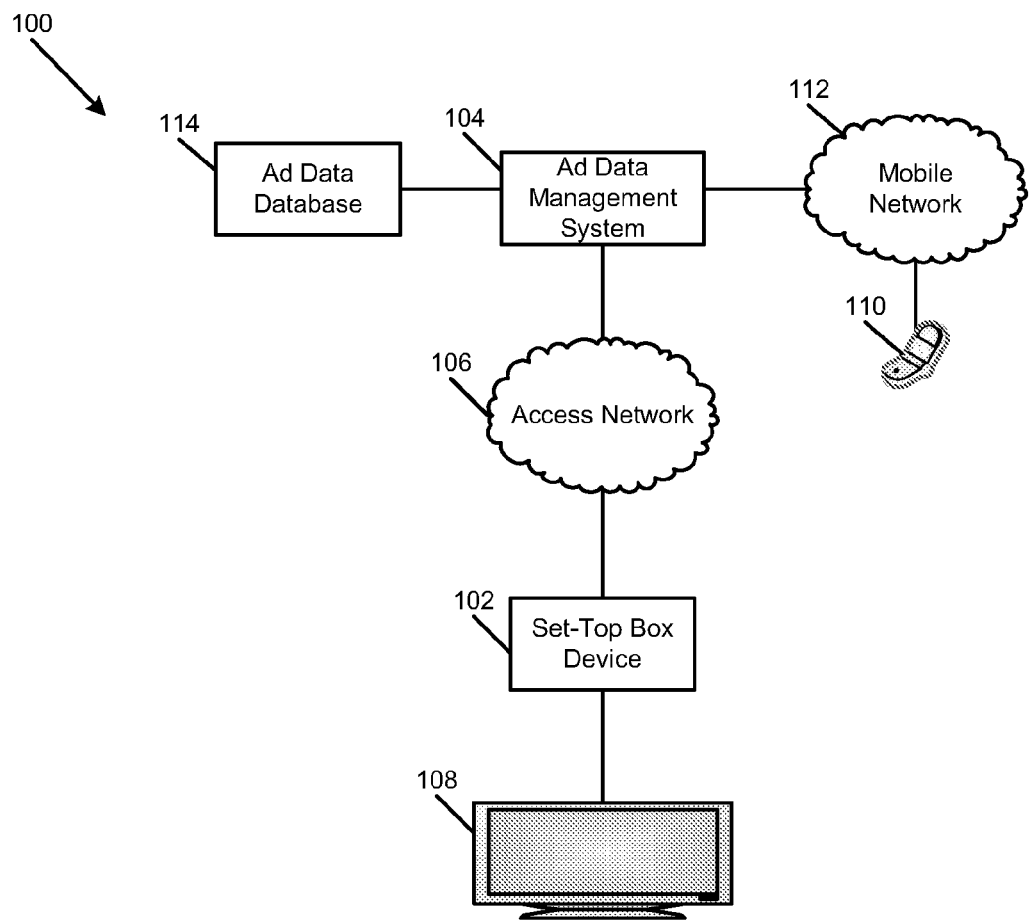
FIG. 1 is a block diagram illustrating a particular embodiment of a system to deliver advertisement data to a mobile device.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed systems, methods or computer-readable media. Moreover, some statements may apply to some features but not to others.

A method of delivering advertisement data to a mobile device includes receiving video content associated with an advertisement at a set-top box device via an access network of a video distribution system. The method also includes receiving an advertisement selection command at the set-top box device. The advertisement selection command indicates that data related to the advertisement is to be sent to a particular mobile device associated with the set-top box device. Further, the method includes sending an indication of the advertisement selection command to an ad data management system via the access network, in response to the advertisement selection command.

In another embodiment, a set-top box device includes processing logic and memory accessible to the processing logic. The memory includes instructions executable by the processing logic to receive video content associated with an advertisement via an access network of a video distribution system. The memory also includes instructions executable by the processing logic to receive an advertisement selection command, where the advertisement selection command indicates that data related to the advertisement is to be sent to a particular mobile device associated with the set-top box device. The memory also includes instructions executable by the processing logic to send an indication of the advertisement selection command to an ad data management system via the access network, in response to the advertisement selection command.

In another embodiment, a system to receive data related to an advertisement includes a mobile device adapted to receive data related to an advertisement from an ad data management system, the advertisement selected by a user of a set-top box device associated with the mobile device. The mobile device is also adapted to activate an ad wallet feature at the mobile device in response to receiving the data, the ad wallet feature adapted to store data related to a plurality of advertisements. Further, the mobile device is adapted to store the data related to the selected advertisement via the ad wallet feature.

In another embodiment, a system to receive data related to an advertisement includes a mobile device adapted to activate an ad data mode in response to user input. The mobile device is also adapted to detect a movement of the mobile device with respect to a landmark. Further, the mobile device is adapted to request, in response to detecting the movement, data related to an advertisement accessible to a set-top box device associated with the mobile device from an ad data management system.

In a further embodiment, a computer-readable medium includes processor-readable instructions that are executable by a processor to perform a method. The method includes receiving an indication of an advertisement selection command from a set-top box device at an ad data management system. The advertisement selection command indicates that data related to an advertisement received at the set-top box device is to be sent to a mobile device associated with the set-top box device. The method also includes sending the data related to the advertisement from the ad data management system to the mobile device in response to the indication.

FIG. 1 shows a particular embodiment of a system 100 to deliver advertisement data to a mobile device. The system 100 includes a set-top box device 102 that communicates with an ad data management system 104 of a video service provider via an access network 106. For example, the set-top box device 102 can communicate with an ad data management system of an Internet Protocol Television (IPTV) service provider via an IPTV access network. In addition, the set-top box device 106 is coupled to a display device 108, such as a television device. Further, the ad data management system 104 communicates with one or more mobile devices 110 associated with the set-top box device 102, or with one or more users of the set-top box device 102, via one or more mobile networks 112. In a particular embodiment, the ad data management system 104 communicates with an ad data database 114.

In an illustrative embodiment, the set-top box device 102 is adapted to receive a request to register a mobile device 110. The set-top box device 102 is adapted to receive registration information, such as contact information, an identifier of the mobile device 110, other registration information, or a combination thereof, associated with the mobile device 110, and to send the registration information to the ad data management system 104. The ad data management system 104 is adapted to add the registration information to a registry of one or more mobile devices associated with the set-top box device 102.

The set-top box device 102 is adapted to receive video content related to an advertisement from a video head-end of a video service provider and to send the video content to the display device 108. In one embodiment, the set-top box device 102 can be adapted to receive metadata with the video content, which includes data related to the advertisement. Additionally, the set-top box device 102 is adapted to receive an advertisement selection command indicating that data related to the advertisement displayed at the display device 108 is to be sent to a mobile device associated with the set-top box device 102. For example, the set-top box device 102 can be adapted to receive a signal or data indicating a selection of a particular key at a remote control device communicating with the set-top box device 102.

The set-top box device 102 is adapted to send data to the ad data management system 104 indicating that data related to an advertisement is to be sent to a mobile device associated with the set-top box device 102. The set-top box device 102 can also be adapted to send program information related to programming received at the set-top box device 102 to the ad data management system 104. For example, the set-top box device 102 can send data to the ad data management system 104 indicating a time when the set-top box device 102 received the advertisement selection command; a channel to which the set-top box device 102 was tuned when it received the advertisement selection command; an identification of a program being received at which the set-top box device 102 when it received the advertisement selection command; other programming information; or any combination thereof. Alternatively, the set-top box device 102 can be adapted to extract metadata from video corresponding to the selected advertisement, where the metadata includes data related to the advertisement. The set-top box device 102 can be adapted to send the data related to the advertisement to the ad data management system 104 with the data indicating that the data is to be sent to a mobile device associated with the set-top box device 102.

In one embodiment, the set-top box device 102 can be adapted to call an ad-to-go application stored at the set-top box device 102. For instance, the ad-to-go application can run in the background at the set-top box device 102 until called. In a particular embodiment, the set-top box device 102 can be adapted to execute the ad-to-go application to send programming information to the ad data management system 104. In another particular embodiment, the set-top box device 102 can be adapted to execute the ad-to-go application to extract data related to the advertisement from metadata received with the selected advertisement, and to send the data to the ad data management system 104 for delivery to a selected mobile device 110.

In another embodiment, the set-top box device 102 can be adapted to send an indication of the advertisement selection command to the ad data management system 104 and to receive a response from the ad data management system 104 that includes instructions to obtain the programming information, the data related to the advertisement, or any combination thereof, and to send the obtained items to the ad data management system 104. In one example, the instructions can include a Java script.

The set-top box device 102 can be adapted to determine whether it has received data from the ad data management system 104 indicating that a plurality of mobile devices are associated with the set-top box device 102. For example, the set-top box device 102 can receive data indicating the mobile devices associated with the set-top box device 102 from the ad data management system 104 and to send a graphical menu of the mobile devices to the display device 108. Further, the set-top box device 102 can be adapted to receive a selection of a mobile device via the graphical menu and to send data indicating the selection to the ad data management system 104.

The ad data management system 104 is adapted to receive registration information related to a mobile device from the set-top box device 102 and to register the mobile device in association with the set-top box device 102. The ad data management system 104 is also adapted to receive program information or data related to an advertisement from the set-top box device 102, along with an indication that data related to an advertisement is to be sent to a mobile device associated with the set-top box device 102. In a particular embodiment, the ad data management system 104 can be adapted to determine whether multiple mobile devices are registered for the set-top box device 102 or an account associated therewith. The ad data management system 104 can be adapted to send data indicating the plurality of mobile devices, such as a menu, to the set-top box device 102 and to receive data indicating a selection of a mobile device from the set-top box device 102.

The ad data management system 104 can be adapted to identify an advertisement based on program information received from the set-top box device 102. For example, the ad data management system 104 can be adapted to identify the advertisement based on a time at which an advertisement selection command was received, a channel to which the set-top box device 102 was tuned at the time, a program being received at the set-top box device 102 at the time, other program information, or any combination thereof. Further, the ad data management system 104 can be adapted to retrieve data related to the identified advertisement from the ad data database 114. The ad data management system 104 sends the retrieved advertisement data to the desired mobile device 110.

Data related to an advertisement can include, for example, electronically readable codes, such as a bar code; an electronic asset that is usable to redeem an offer related to an advertisement, such as an electronic coupon; a mobile version of the advertisement; other data related to an advertisement; or any combination thereof. Other examples of data related to an advertisement include a date, a time, a location, terms, an identification of a product, an identification of a service, other information, or any combination thereof, related to an offer or event.

The mobile device 110 can be adapted to receive data related to an advertisement and to open or otherwise activate an ad wallet feature, such as an ad wallet folder, in response to receiving the data. The mobile device 110 can be adapted to receive the data from the ad data management system 104 via short messaging service (SMS), e-mail, Internet, or another mobile communication method. In one embodiment, the data related to the advertisement can include tags or other data indicating that the data is advertisement-related. In another embodiment, the mobile device 110 can be adapted to identify the data as being related to an advertisement. The mobile device 110 is adapted to store the data related to the advertisement via the ad wallet. The mobile device 110 can be adapted to receive a selection of the ad wallet, e.g., via a graphical user interface or hot key at the mobile device 110, and to graphically display selectable indicators of contents of the ad wallet. The mobile device 110 can be adapted to receive a selection of an indicator of the advertisement via the graphical display and to display the data related to the selected advertisement.

In another illustrative embodiment, the mobile device 110 can be adapted to activate an ad data mode in response to user input. Further, the mobile device 110 can be adapted to detect a particular motion with respect to the display device 108, the set-top box device 102, other visible object or landmark, or a combination thereof, when the mobile device 110 is in the ad data mode. For instance, the mobile device 110 can determine via a camera that the mobile device 110 has been moved in a particular direction or a particular combination of directions with respect to the visible object or landmark. In response to detecting the particular motion, the mobile device 110 can be adapted to send a request to an ad data management system 104 for advertisement data related to an advertisement presented at a set-top box device 102 associated with the mobile device 110.

The ad data management system 104 is adapted to receive a request for advertisement data from the mobile device 110 and to identify a set-top box device associated with the mobile device 110, such as the set-top box device 102. The ad data management system 104 is adapted to identify programming (such as a channel, a television program, other programming identification, or any combination thereof) received at the set-top box device 102 and to identify, based on the identified programming, an advertisement received at the set-top box device 102 at or about the time that the ad data management system 104 received the request for advertisement data from the mobile device 110. The ad data management system 104 is adapted to retrieve advertisement data related to the identified advertisement from the advertisement data database 114 and to send the advertisement data to the mobile device 110. The mobile device 110 is adapted to receive data related to an advertisement from the ad data management system 104. The mobile device 110 stores the data related to the advertisement in association with an ad wallet folder.

Figure 2:
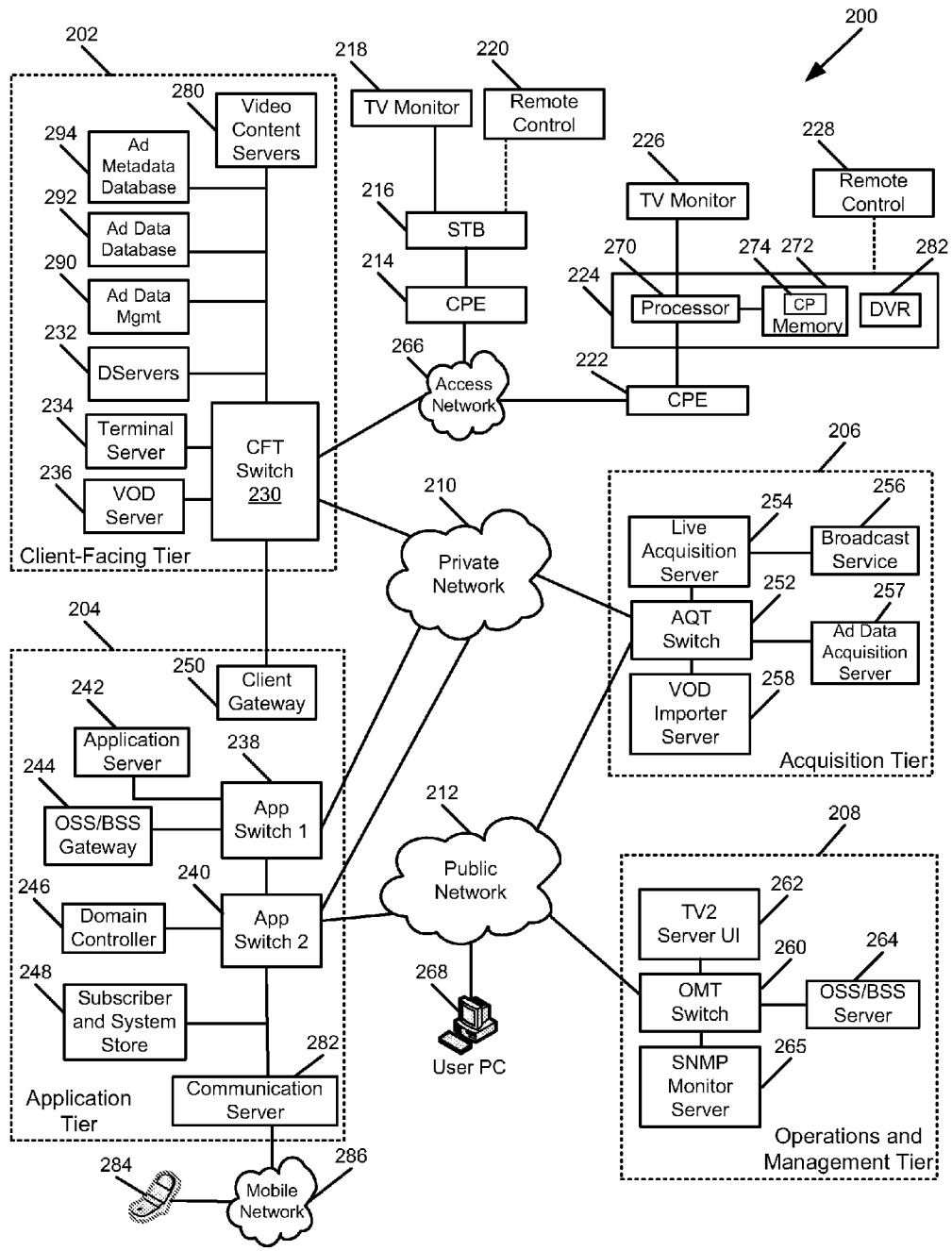
FIG. 2 is a block diagram illustrating a second particular embodiment of a system to deliver advertisement data to a mobile device.

FIG. 2 shows a second particular embodiment of a system 200 to deliver advertisement data to a mobile device. The system 200 includes elements of an IPTV system having a client facing tier 202, an application tier 204, an acquisition tier 206, and an operations and management tier 208. Each tier 202, 204, 206, and 208 is coupled to a private network 210, a public network 212, or both the private network 210 and the public network 212. For example, the client-facing tier 202 can be coupled to the private network 210, while the application tier 204 can be coupled to the private network 210 and to a public network, such as the Internet. The acquisition tier 206 can also be coupled to the private network 210 and to the public network 212. Moreover, the operations and management tier 208 can be coupled to the public network 212.

The various tiers 202, 204, 206 and 208 communicate with each other via the private network 210 and the public network 212. For instance, the client-facing tier 202 can communicate with the application tier 204 and the acquisition tier 206 via the private network 210. The application tier 204 can also communicate with the acquisition tier 206 via the private network 210. Further, the application tier 204 can communicate with the acquisition tier 206 and the operations and management tier 208 via the public network 212. Moreover, the acquisition tier 206 can communicate with the operations and management tier 208 via the public network 212. In a particular embodiment, elements of the application tier 204 can communicate directly with the client-facing tier 202.

The client-facing tier 202 can communicate with user equipment via a private access network 266, such as an IPTV access network. In an illustrative embodiment, customer premises equipment (CPE) such as a first CPE device 214 and a second CPE device 222 can be coupled to the private access network 266. The CPE devices 214 and 222 can include modems (e.g., digital subscriber line modems), residential gateways, routers, other devices, or any combination thereof. The client-facing tier 202 can communicate with a first representative set-top box (STB) device 216 via the first CPE device 214 and with a second representative set-top box device 224 via the second CPE device 222. The client-facing tier 202 can communicate with a large number of set-top boxes over a wide geographic area, such as a regional area, a metropolitan area, a viewing area, or any other suitable geographic area that can be supported by networking the client-facing tier 202 to numerous set-top box devices. In one embodiment, the client-facing tier 202 can be coupled to the CPE devices 214 and 222 via fiber optic cables. Alternatively, the CPE devices 214 and 222 can be digital subscriber line (DSL) modems that are coupled to one or more network nodes via twisted pairs, and the client-facing tier 202 can be coupled to the network nodes via fiber-optic cables. Each of the set-top box devices 216 and 224 can process data received from the private access network 266 via an IPTV software platform such as Microsoft® TV IPTV Edition.

The first set-top box device 216 can be coupled to a first display device 218, such as a first television monitor, and the second set-top box device 224 can be coupled to a second display device 226, such as a second television monitor. Moreover, the first set-top box device 216 can communicate with a first remote control 220, and the second set-top box device 224 can communicate with a second remote control 228. In an exemplary, non-limiting embodiment, each of the set-top box devices 216 and 224 can receive data or video from the client-facing tier 202 via the private access network 266 and render or display the data or video at the display device 218 or 226 to which it is coupled. The set-top box devices 216 and 224 may include tuners that receive and decode television programming information for transmission to the display devices 218 and 226. Further, each of the set-top box devices 216 and 224 can include processing logic and memory accessible to the processing logic, such as the STB processor 270 and the STB memory device 272. Each STB memory device may include one or more computer programs, such as the computer program 274, that are executable by the STB processing logic. In one embodiment, one or more of the set-top box devices 216 and 224 may include integrated digital video recorder (DVR) devices or components, such as the DVR 282. In other embodiments, one or more of the set-top box devices 216 and 224 can be coupled to external DVR devices.

In an illustrative embodiment, the client-facing tier 202 can include a client-facing tier (CFT) switch 230 that manages communication between the client-facing tier 202 and the private access network 266, and between the client-facing tier 202 and the private network 210. As shown, the CFT switch 230 is coupled to one or more distribution servers (D-servers) 232 that may receive and store video content, requests for video content, other data, or any combination thereof, which is bound to and from the set-top box devices 216 and 224. The CFT switch 230 can also be coupled to a terminal server 234 that provides terminal devices with a common connection point to the private network 210. In a particular embodiment, the CFT switch 230 can also be coupled to a video-on-demand (VOD) server 236. The CFT switch 230 is also coupled to a plurality of video servers 280 that store video content that is to be distributed via the access network 266 to the set-top box devices 216 and 224. In an illustrative, non-limiting embodiment, each of the video servers 280 can be associated with one or more channels. Video content related to advertisements that are received by the video servers 280 or the D-server(s) 232 can include advertisement identifiers, metadata, or a combination thereof.

Further, the CFT switch 230 can be coupled to one or more ad data management servers 290 that are adapted to receive requests from the set-top box devices 216, 224 to send data related to advertisements to mobile devices. Additionally, CFT switch 230 can be coupled to an ad data database 292 can be adapted to store data related to one or more advertisements. The CFT switch 230 can also be coupled to an ad metadata database 294 that is adapted to store metadata that the video servers 280 can include with video related to one or more advertisements, where the metadata includes data related to one or more advertisements. In an illustrative embodiment, the ad data database 292, the ad metadata database 294, or a combination thereof, can be adapted to receive data related to advertisements from an advertisement data acquisition (ADA) server 257 at the acquisition tier 206.

The application tier 204 communicates with both the private network 210 and the public network 212. The application tier 204 can include a first application tier (APP) switch 238 and a second APP switch 240. The first APP switch 238 can be coupled to the second APP switch 240. The first APP switch 238 can be coupled to an application server 242 and to an OSS/BSS gateway 244. The application server 242 provides applications to the set-top box devices 216 and 224 via the private access network 266. Such applications enable the set-top box devices 216 and 224 to provide functions such as display, messaging, processing of IPTV data and VOD material, gaming functions, other functions, or any combination thereof. In a particular embodiment, the OSS/BSS gateway 244 includes operation systems and support (OSS) data, as well as billing systems and support (BSS) data.

The second APP switch 240 is coupled to a domain controller 246 that is adapted to provide web access, for example, to subscribers via the public network 212. In addition, the second APP switch 240 is coupled to a recommendation server 247 that is adapted to provide recommendations related to the IPTV service to subscribers. The second APP switch 240 can be coupled to a subscriber and system store 248 that includes account information, such as account information that is associated with users who access the system 200 via the private network 210 or the public network 212. In a particular embodiment, the application tier 204 can also include a client gateway 250 that communicates data directly to the client-facing tier 202. In this embodiment, the client gateway 250 can be coupled directly to the CFT switch 230. The client gateway 250 can provide user access to the private network 210 and the tiers coupled thereto. Further, the second APP switch 240 is coupled to a communication server 282 that communicates with mobile devices, such as the cellular phone 284, via one or more mobile communication networks 286.

In a particular embodiment, the set-top box devices 216 and 224 can access the system via the private access network 266 using information received from the client gateway 250. The private access network 266 provides security for the private network 210. User devices can access the client gateway 250 via the private access network 266, and the client gateway 250 can allow such devices to access the private network 210 once the devices are authenticated or verified. Similarly, the client gateway 250 can prevent unauthorized devices, such as hacker computers or stolen set-top box devices, from accessing the private network 210 by denying access to these devices beyond the private access network 266.

For example, when the set-top box device 216 accesses the system 200 via the private access network 266, the client gateway 250 can verify subscriber information by communicating with the subscriber and system store 248 via the private network 210, the first APP switch 238 and the second APP switch 240. Further, the client gateway 250 can verify billing information and status by communicating with the OSS/BSS gateway 244 via the private network 210 and the first APP switch 238. The OSS/BSS gateway 244 can transmit a query across the first APP switch 238, to the second APP switch 240, and the second APP switch 240 can communicate the query across the public network 212 to the OSS/BSS server 264. After the client gateway 250 confirms subscriber and/or billing information, the client gateway 250 can allow the set-top box device 216 access to IPTV content and VOD content. If the client gateway 250 cannot verify subscriber information for the set-top box device 216, (e.g., it is connected to a different twisted pair), the client gateway 250 can deny transmissions to and from the set-top box device 216 beyond the private access network 266.

The acquisition tier 206 includes an acquisition tier (AQT) switch 252 that communicates with the private network 210. The AQT switch 252 can also communicate with the operations and management tier 208 via the public network 212. In a particular embodiment, the AQT switch 252 can be coupled to a live acquisition server 254 that receives television content, for example, from a broadcast service 256. The television content can include video content, metadata, identifiers, or any combination thereof, related to advertisements. Further, the AQT switch can be coupled to a video-on-demand importer server 258 that stores television content received at the acquisition tier 206 and communicates the stored content to the client-facing tier 202 via the private network 210. In an illustrative embodiment, the AQT switch 252 can be coupled to an advertisement data acquisition (ADA) server 257 adapted to receive data related to advertisements from advertisers, video content providers, other sources, or a combination thereof, and to send the data to the ad data database 292, the ad metadata database 294, or a combination thereof.

The operations and management tier 208 can include an operations and management tier (OMT) switch 260 that conducts communication between the operations and management tier 208 and the public network 212. In the illustrated embodiment, the OMT switch 260 is coupled to a TV2 server 262 that is adapted to provide a TV2 user interface to user computers 268 via the public network 212, for example.

Additionally, the OMT switch 260 can be coupled to an OSS/BSS server 264 and to a simple network management protocol (SNMP) monitor 265 that monitors network devices. In a particular embodiment, the OMT switch 260 can communicate with the AQT switch 252 via the public network 212.

In an illustrative embodiment, a set-top box device, such as the set-top box device 216, is adapted to receive a request to register a mobile device, such as the cellular phone 284. The set-top box device 216 is adapted to receive registration information associated with the cellular phone 284 and to send the registration information to the ad data management system 290. The ad data management system 290 is adapted to add the registration information to a registry of one or more mobile devices associated with the set-top box device 216.

In addition, the set-top box device 216 is adapted to receive video content related to an advertisement from a video content server 280, a D-server 232, or another server, and to send the video content to the display device 218. In one embodiment, the set-top box device 216 can be adapted to receive metadata with the video content, which includes data related to the advertisement. Additionally, the set-top box device 216 is adapted to receive an advertisement selection command indicating that data related to the advertisement displayed at the display device 218 is to be sent to a mobile device associated with the set-top box device 216. For example, the set-top box device 216 can be adapted to receive a signal or data indicating a selection of a particular key at the remote control device 220.

The set-top box device 216 is adapted to send data to the ad data management system 290 indicating that data related to an advertisement is to be sent to a mobile device associated with the set-top box device 216, such as the cellular phone 284. The set-top box device 216 can also be adapted to send program information related to programming received at the set-top box device 216 to the ad data management system 290. Alternatively, the set-top box device 216 can be adapted to extract metadata from video corresponding to the selected advertisement, where the metadata includes data related to the advertisement. The set-top box device 216 can be adapted to send the data related to the advertisement to the ad data management system 290 with the data indicating that the data is to be sent to a mobile device associated with the set-top box device 216.

In one embodiment, the set-top box device 216 can be adapted to call an ad-to-go application stored at the set-top box device 216. For instance, the ad-to-go application can run in the background at the set-top box device 216 until called. In another embodiment, the set-top box device 216 can be adapted to call the ad-to-go application from the application 242 or another server of the IPTV system 200. In a particular embodiment, the set-top box device 216 can be adapted to execute the ad-to-go application to send programming information to the ad data management system 290. In another particular embodiment, the set-top box device 216 can be adapted to execute the ad-to-go application to extract data related to the advertisement from metadata received with the selected advertisement, and to send the data to the ad data management system 290 for delivery to a selected mobile device, such as the cellular phone 284.

In one embodiment, the advertisement selection command can indicate a selection of an advertisement being displayed at the display device 218. In another embodiment, such as where metadata is sent with video content corresponding to advertisements, the set-top box device 216 can be adapted to display a graphical menu of advertisements in response to the advertisement selection command, and the set-top box device 216 can be adapted to receive a selection of the advertisement from the graphical menu. For instance, the graphical menu of advertisements can include selectable indicators of advertisements displayed at the display device 218 within a period of time prior to receipt of the advertisement selection command at the set-top box device 216.

In another embodiment, the set-top box device 216 can be adapted to send an indication of the advertisement selection command to the ad data management system 290 and to receive a response from the ad data management system 290 that includes instructions to obtain the programming information, the data related to the advertisement, or any combination thereof, and to send the obtained items to the ad data management system 290. In one example, the instructions can include a Java script.

The set-top box device 216 can be adapted to determine whether it has received data from the ad data management system 290 indicating that a plurality of mobile devices are associated with the set-top box device 216. For example, the set-top box device 216 can receive data indicating the mobile devices associated with the set-top box device 216 from the ad data management system 290 and to send a graphical menu of the mobile devices to the display device 218. Further, the set-top box device 216 can be adapted to receive a selection of a mobile device via the graphical menu and to send data indicating the selection to the ad data management system 290.

The ad data management system 290 is adapted to receive registration information related to a mobile device from the set-top box device 216 and to register the mobile device in association with the set-top box device 216. The ad data management system 290 is also adapted to receive program information or data related to an advertisement from the set-top box device 216, along with an indication that data related to an advertisement is to be sent to a mobile device associated with the set-top box device 216. In a particular embodiment, the ad data management system 290 can be adapted to determine whether multiple mobile devices are registered for the set-top box device 216 or an account associated therewith. The ad data management system 290 can be adapted to send data indicating the plurality of mobile devices, such as a menu, to the set-top box device 216 and to receive data indicating a selection of a mobile device from the set-top box device 216.

The ad data management system 290 can be adapted to identify an advertisement based on program information received from the set-top box device 216. For example, the ad data management system 290 can be adapted to identify the advertisement based on a time at which an advertisement selection command was received, a channel to which the set-top box device 216 was tuned at the time, a program being received at the set-top box device 216 at the time, other program information, or any combination thereof. Further, the ad data management system 290 can be adapted to retrieve data related to the identified advertisement from the ad data database 292. The ad data management system 290 sends the retrieved advertisement data to the desired mobile device, such as the cellular phone 284, via the communication server 282. In a particular embodiment, the communication server 282 is adapted to send data related to an advertisement to mobile devices, such as the cellular phone 284, via short messaging service (SMS), e-mail, Internet, or another mobile communication method.

The mobile device 284 can be adapted to receive data related to an advertisement and to open or otherwise activate an ad wallet feature, such as an ad wallet folder, in response to receiving the data. The cellular phone 284 can be adapted to receive the data from the ad data management system 290 via short messaging service (SMS), e-mail, Internet, or another mobile communication method. In one embodiment, the data related to the advertisement can include tags or other data indicating that the data is advertisement-related. In another embodiment, the cellular phone 284 can be adapted to identify the data as being related to an advertisement. The cellular phone 284 is adapted to store the data related to the advertisement via the ad wallet. The cellular phone 284 can be adapted to receive a selection of the ad wallet, such as via a graphical user interface or hot key at the cellular phone 284, and to graphically display selectable indicators of contents of the ad wallet. The cellular phone 284 can be adapted to receive a selection of an indicator of the advertisement via the graphical display and to display the data related to the selected advertisement.

In an illustrative embodiment, the cellular phone 284 can be adapted to activate an ad data mode in response to user input. Further, the cellular phone 284 can be adapted to detect a particular motion with respect to the display device 218, the set-top box device 216, other visible object or landmark, or a combination thereof, when the cellular phone 284 is in the ad data mode. For instance, the cellular phone 284 can determine via a camera that the cellular phone 284 has been moved in a particular direction or a particular combination of directions with respect to the visible object or landmark. In response to detecting the particular motion, the cellular phone 284 can be adapted to send a request to the ad data management system 290 for advertisement data related to an advertisement presented at a set-top box device 216 associated with the cellular phone 284.

The ad data management system 290 is adapted to receive a request for advertisement data from the cellular phone 284 and to identify a set-top box device associated with the cellular phone 284, such as the set-top box device 216. The ad data management system 290 is adapted to identify programming (such as a channel, a television program, other programming identification, or any combination thereof) received at the set-top box device 216 and to identify, based on the identified programming, an advertisement received at the set-top box device 216 at or about the time that the ad data management system 290 received the request for advertisement data from the cellular phone 284. The ad data management system 290 is adapted to retrieve advertisement data related to the identified advertisement from the advertisement data database 292 and to send the advertisement data to the cellular phone 284. The cellular phone 284 is adapted to receive data related to an advertisement from the ad data management system 290. The cellular phone 284 stores the data related to the advertisement in association with an ad wallet folder.

Figure 3:
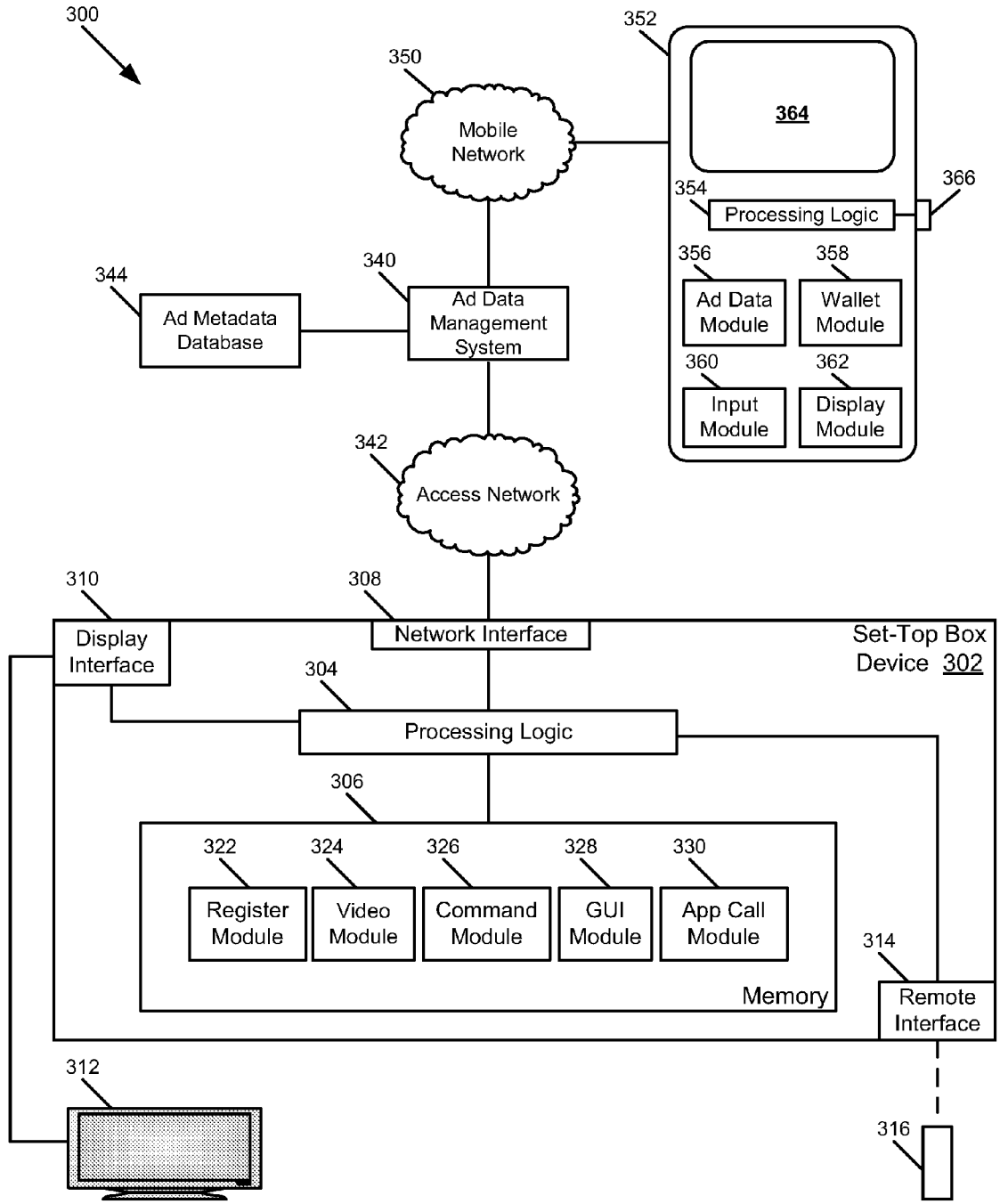
FIG. 3 is a block diagram illustrating a third particular embodiment of a system to deliver advertisement data to a mobile device.

FIG. 3 illustrates a third particular embodiment of a system 300 to deliver advertising data to a mobile device. The system 300 includes a set-top box device 302 that communicates with an ad data management system 340 of a video service provider via an access network 342. Additionally, the ad data management system 340 communicates with a mobile device 352 via a mobile network 350. In a particular embodiment, the ad data management system 340 can also communicate with an ad metadata database 344.

The set-top box device 302 includes processing logic 304 and memory 306 accessible to the processing logic 304. In addition, the set-top box device 302 includes a network interface 308 adapted to facilitate communication between the set-top box device 302 and the access network 342. Further, the set-top box device 302 includes a display interface 310 adapted to couple a display device 312 to the set-top box device 302. The set-top box device 302 also communicates with a remote control device 316 via a remote interface 314.

The memory 306 includes a plurality of modules 322-332. The modules 322-332 can include computer instructions that are readable and executable by the processing logic 304 to implement various functions of the set-top box device 302 with respect to delivering advertising data to a mobile device. For example, the modules 322-332 can represent various aspects of one or more software applications, operating systems, or other computer programs. In other embodiments, the modules 322-332 can be implemented as hardware logic or a combination of hardware logic and computer instructions.

The memory 306 includes a register module 322 executable by the processing logic 304 to receive a request to register a mobile device 352. The register module 322 is also executable by the processing logic receive registration information associated with the mobile device 352 and to send the registration information to the ad data management system 340. In one embodiment, the register module 322 can be executable by the processing logic 304 to prompt a user for contact information, an identifier of the mobile device 352 (e.g., Jon's cell phone), other registration information, or any combination thereof, in response to the request to register the mobile device 352 with the set-top box device 302.

The memory 306 includes a video module 324 executable by the processing logic 304 to receive video content related to television content, including one or more advertisements and to send the video content to the display device 312. In an illustrative embodiment, the video module 324 can be executable by the processing logic 304 to buffer video content to prevent underflow to the display device 312. In addition, the video module 324 can be executable by the processing logic 304 to receive metadata with video content of each advertisement.

The memory 306 includes a command module 326 executable by the processing logic 304 to receive an advertisement selection command indicating that data related to an advertisement displayed at the display device 312 is to be sent to a mobile device associated with the set-top box device 302. For example, the command module 326 can be executable by the processing logic 304 to receive a signal or data indicating a selection of an advertisement data key or other particular key at the remote control device 316. The command module 326 is executable by the processing logic 304 to send data to the ad data management system 340 indicating that data related to an advertisement is to be sent to a mobile device associated with the set-top box device 302, such as the mobile device 352. The command module 326 is executable by the processing logic 304 to send program information related to programming received at the set-top box device 302 to the ad data management system 340. Alternatively, the command module 326 can be executable by the processing logic 304 to send data related to the advertisement to the ad data management system 340 with the data indicating that the data is to be sent to a mobile device associated with the set-top box device 302.

The memory 306 can include a graphical user interface (GUI) module 328 that is executable by the processing logic 304 to send a graphical menu of recently displayed advertisements to the display device 312 in response to the advertisement selection command and to receive a selection of the advertisement from the graphical menu. For instance, the graphical menu of advertisements can include selectable indicators of advertisements displayed at the display device 312 within a period of time prior to receipt of the advertisement selection command at the set-top box device 302. The GUI module 328 can also be executable by the processing logic 304 to receive data from the ad data management system 340 indicating that a plurality of mobile devices are associated with the set-top box device 302, and to send a graphical menu of mobile devices associated with the set-top box device 302 to the display device 312. The GUI module 328 can be executable by the processing logic 304 to receive a selection of a mobile device, such as the mobile device 352, via the graphical menu.

In an illustrative embodiment, the memory 306 can include an application call module 330 executable by the processing logic 304 to call an ad-to-go application. In one example, the ad-to-go application can be stored at the memory 306 and can run in the background at the set-top box device 302 until called. The ad-to-go application can be executable by the processing logic 304 to send program information associated with the selected mobile device 352 to the ad data management system 340. In another particular embodiment, the ad-to-go application can be executable by the processing logic 304 to extract data related to the advertisement from metadata received with the selected advertisement, and to send the data to the ad data management system 340. In another embodiment, the application call module 330 can be executable by the processing logic 304 to request the ad-to-go application from the ad data management system 340 or another source and to receive the ad-to-go application or instructions to obtain program information or data related to the selected advertisement.

The ad data management system 340 is adapted to send data related to the advertisement to the selected mobile device 352. The mobile device 352 can comprise a mobile phone, such as a cellular phone, a personal data assistant, a mobile computing device, a digital music player adapted to communicate with a mobile network, another mobile device, or any combination thereof. The mobile device 352 includes processing logic 354 and a plurality of modules 356-362 that are executable by the processing logic 354 to perform various functions of the mobile device 352 with respect to receiving advertising data. The mobile device 364 also includes a display portion 364. In an illustrative embodiment, the modules 356-362 can include instructions stored in a memory at the mobile device 352. In other embodiments, the modules 356-362 can be implemented as hardware logic or a combination of hardware logic and computer instructions.

The mobile device 352 includes an advertising data module 356 executable by the processor 354 to receive data related to an advertisement and to open or otherwise activate an ad wallet module 358, such as an ad wallet folder, in response to receiving the data. In one embodiment, the data related to the advertisement can include data indicating that the data is advertisement-related. In another embodiment, the advertising data module 356 is executable by the processing logic 354 to identify the data as being related to an advertisement. The ad wallet module 356 stores advertisement data and can be executable by the processor 354 to organize the advertisement data according to user commands, such as alphabetically, by time of receipt, expiration date, offer date, event date, other organizational schemes, or any combination thereof.

The mobile device 352 includes an input module 360 executable by the processor 354 to receive a selection of the ad wallet, e.g., from a graphical user interface at the mobile device 352 or via an assignable hot key 366, and the mobile device 352 includes a display module 362 that is executable by the processor 354 to graphically display selectable indicators of contents of the ad wallet. Though the hot key 366 is shown on a side of the mobile device, the hot key 366 may be disposed elsewhere on the mobile device 352. For instance, the hot key 366 can comprise a key of a cellular phone number pad that has been assigned to activate the ad wallet. Further, the input module 360 can be adapted to receive a selection of the data related to the advertisement, and display module 362 is executable by the processor 354 to display the data related to the selected advertisement.

In one embodiment, the ad data module 356 can be executable by the processing logic 354 to activate an ad data mode in response to user input. Further, the input module 360 can be adapted to detect a particular motion with respect to the display device 312, the set-top box device 302, other visible object or landmark, or a combination thereof, when the mobile device 352 is in the ad data mode. The ad data module 356 can be executable by the processing logic 354 to send a request to the ad data management system 340 for advertisement data related to an advertisement presented at the set-top box device 302 associated with the mobile device 352.

Figure 4:
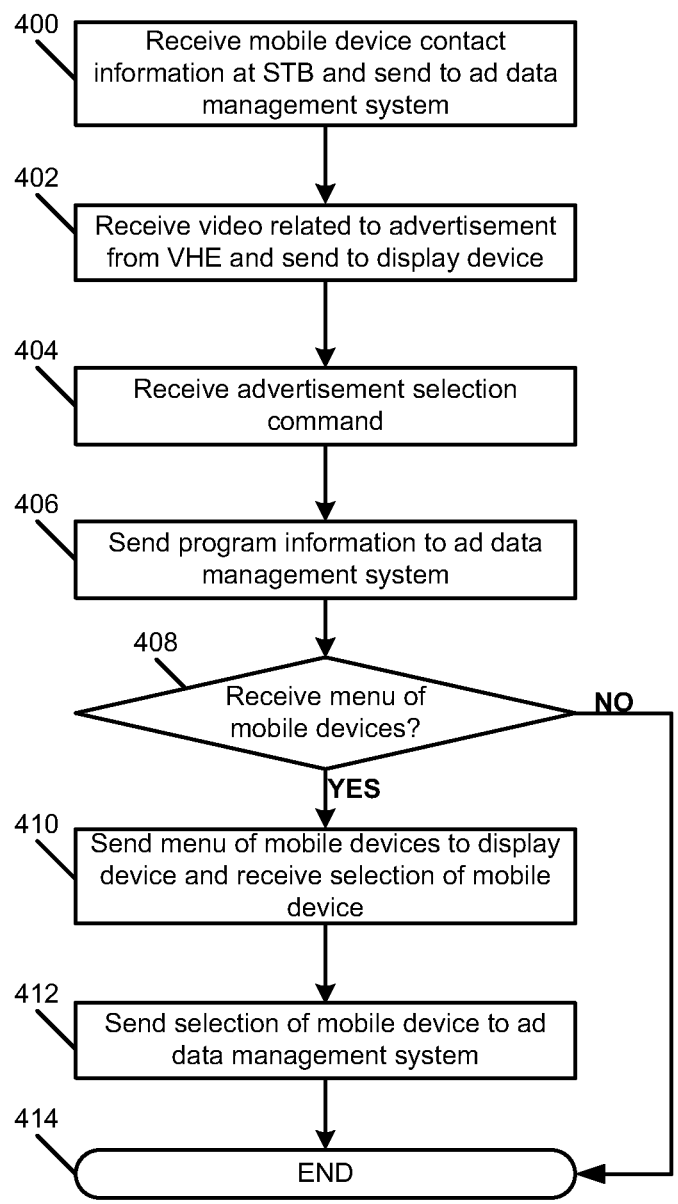
FIG. 4 is a flow diagram illustrating a particular embodiment of a method of delivering advertisement data to a mobile device.

FIG. 4 shows a particular embodiment of a method of delivering advertisement data to a mobile device. At block 400, a set-top box device receives registration information associated with a mobile device, such as a cellular phone. The set-top box device sends the registration information to an ad data management system to be stored in a registry of mobile devices associated with the set-top box device. Moving to block 402, the set-top box device receives video content related to an advertisement from a video head-end of a video content service provider and sends the video content to a display device coupled to the set-top box device. In one embodiment, the set-top box device can receive and store an identifier associated with the advertisement. Proceeding to block 404, the set-top box device receives an advertisement selection command indicating that data related to the advertisement is to be sent to a mobile device associated with the set-top box device.

Continuing to block 406, the set-top box device sends program information related to programming received at the set-top box device to the ad data management system. For example, the set-top box device can send data to the ad data management system indicating a time at which the set-top box device received the advertisement selection command; a channel to which the set-top box device was tuned when it received the advertisement selection command; an identification of a program being received at which the set-top box device when it received the advertisement selection command; other programming information; or any combination thereof.

Advancing to decision node 408, in a particular embodiment, the set-top box device can determine whether it has received data from the ad data management system corresponding to a plurality of mobile devices associated with the set-top box device. For example, the set-top box device can receive a menu of mobile devices associated with the set-top box device. If the set-top box device receives data corresponding to a menu of mobile devices from the ad data management system, the method moves to block 410, and the set-top box device sends the menu of mobile devices to a display device. Further, the set-top box device receives a selection of a mobile device via the menu. Proceeding to block 412, the set-top box device sends data indicating the selection to the ad data management system. The method terminates at 414.

Figure 5:
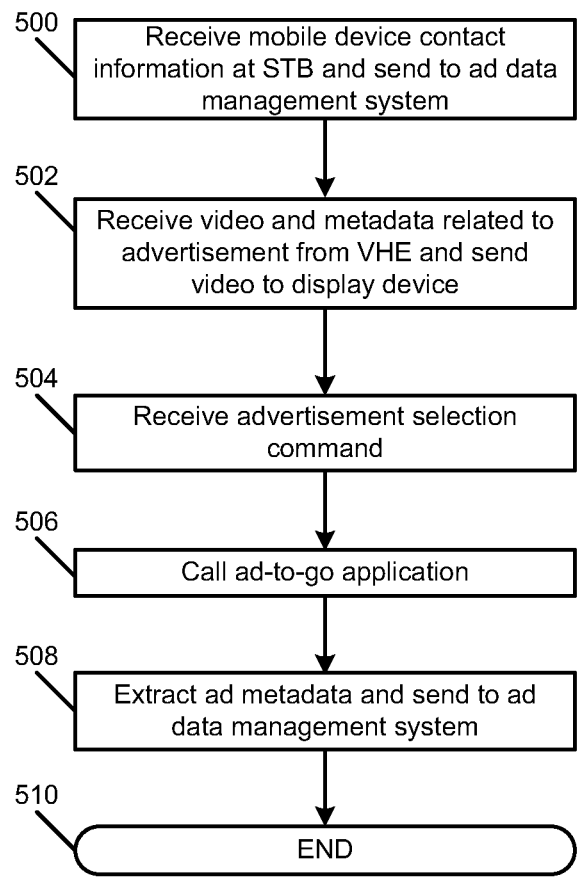
FIG. 5 is a flow diagram illustrating a second particular embodiment of a method of delivering advertisement data to a mobile device.

FIG. 5 illustrates a second particular embodiment of a method of delivering advertisement data to a mobile device. At block 500, a set-top box device receives registration information associated with a mobile device, such as a cellular phone. The set-top box device sends the registration information to an ad data management system to be stored in a registry of mobile devices associated with the set-top box device.

Moving to block 502, the set-top box device receives video content related to an advertisement from a video head-end of a video content service provider and sends the video content to a display device coupled to the set-top box device. In one embodiment, the set-top box device can receive and store an identifier associated with the advertisement. Proceeding to block 504, the set-top box device receives an advertisement selection command indicating that data related to the advertisement is to be sent to a mobile device associated with the set-top box device.

Continuing to block 506, the set-top box device calls an ad-to-go application from a network application server or from a background at the set-top box device. Advancing to block 508, the set-top box device can extract metadata from video corresponding to the selected advertisement. The metadata includes data related to the advertisements. The set-top box device sends the metadata to the ad data management system to be communicated to the mobile device. The method terminates at 510.

Figure 6:
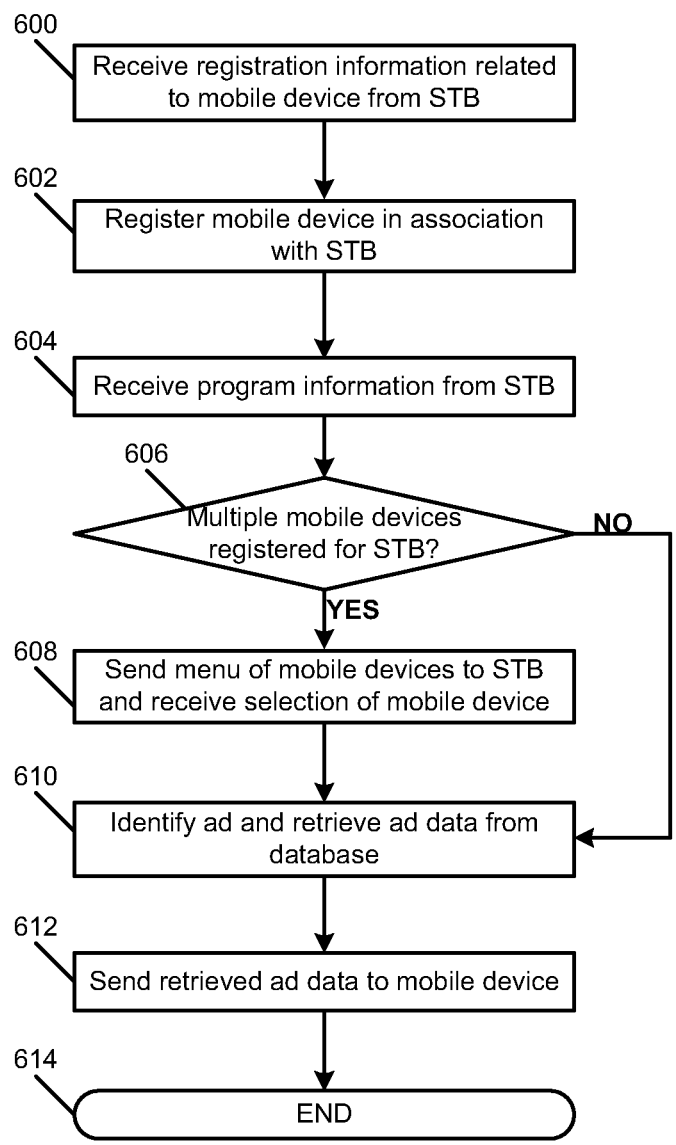
FIG. 6 is a flow diagram illustrating a third particular embodiment of a method of delivering advertisement data to a mobile device.

FIG. 6 illustrates a third particular embodiment of a method of delivering advertisement data to a mobile device. At block 600, an ad data management system receives registration information related to a mobile device from a set-top box device. Moving to block 602, the ad data management system registers the mobile device in association with the set-top box device. Proceeding to block 604, the ad data management system receives program information from the set-top box device. The program information can be included with an indication that data related to an advertisement is to be sent to a mobile device associated with the set-top box device.

Continuing to decision node 606, the ad data management system determines whether multiple mobile devices are registered for the set-top box device or an account associated therewith. If multiple mobile devices are not registered for the set-top box device, the method advances to block 610. On the other hand, if multiple mobile devices are registered for the set-top box device, the method advances to block 608, and the ad data management system sends data indicating the plurality of mobile devices, such as a menu, to the set-top box device and receives data indicating a selection of a mobile device from the set-top box device. The method then continues to block 610.

At block 610, the ad data management system identifies an advertisement based on the program information received from the set-top box device. Further, the ad data management system retrieves data related to the identified advertisement from a database. Moving to block 612, the ad data management system sends the retrieved advertisement data to the desired mobile device. The method terminates at 614.

Figure 7:
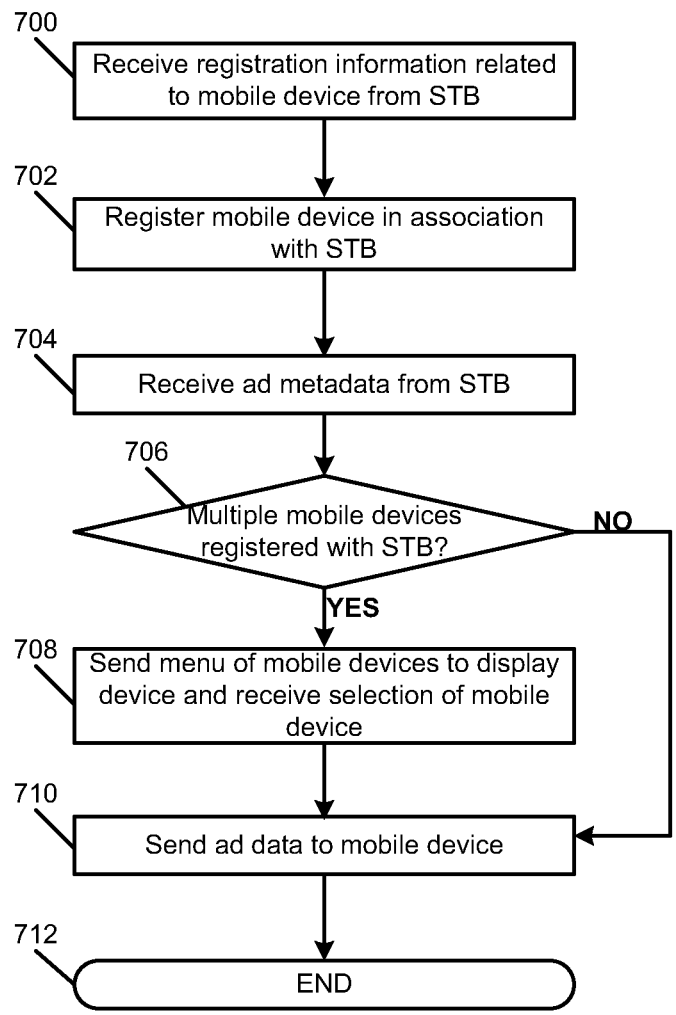
FIG. 7 is a flow diagram illustrating a fourth particular embodiment of a method of delivering advertisement data to a mobile device.

FIG. 7 illustrates a fourth particular embodiment of a method of delivering advertisement data to a mobile device. At block 700, an ad data management system receives registration information related to a mobile device from a set-top box device. Moving to block 702, the ad data management system registers the mobile device in association with the set-top box device. Proceeding to block 704, the ad data management system receives advertisement data from the set-top box device. The program information can be included with an indication that data related to an advertisement is to be sent to a mobile device associated with the set-top box device. In one embodiment, the advertisement data can be extracted by the set-top box device from metadata included with video content corresponding to the advertisement.

Continuing to decision node 706, the ad data management system determines whether multiple mobile devices are registered for the set-top box device or an account associated therewith. If multiple mobile devices are not registered for the set-top box device, the method advances to block 710. On the other hand, if multiple mobile devices are registered for the set-top box device, the method advances to block 708, and the ad data management system sends data indicating the plurality of mobile devices, such as a menu, to the set-top box device and receives data indicating a selection of a mobile device from the set-top box device. The method then continues to block 710. At block 710, the ad data management system sends the received advertisement data to the desired mobile device. The method terminates at 712.

Figure 8:
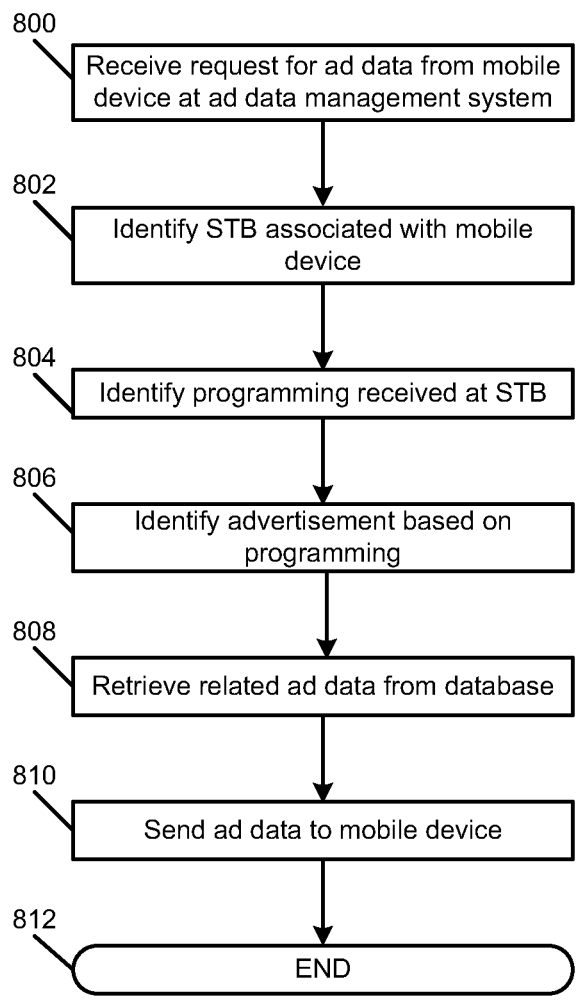
FIG. 8 is a flow diagram illustrating a fifth particular embodiment of a method of delivering advertisement data to a mobile device.

FIG. 8 illustrates a fifth particular embodiment of a method of delivering advertisement data to a mobile device. At block 800, an ad data management system receives a request for advertisement data from a mobile device. Moving to block 802, the ad data management system identifies a set-top box device associated with the mobile device. Proceeding to block 804, the ad data management system identifies programming (such as a channel, a television program, other programming identification, or any combination thereof) received at the set-top box device.

Continuing to block 806, the ad data management system identifies, based on the identified programming, an advertisement received at the set-top box device at or about the time that the ad data management system received the request for advertisement data from the mobile device. Advancing to block 808, the ad data management system retrieves advertisement data related to the identified advertisement from an advertisement data database. At block 810, the ad data management system sends the advertisement data to the mobile device. The method terminates at 812.

Figure 9:
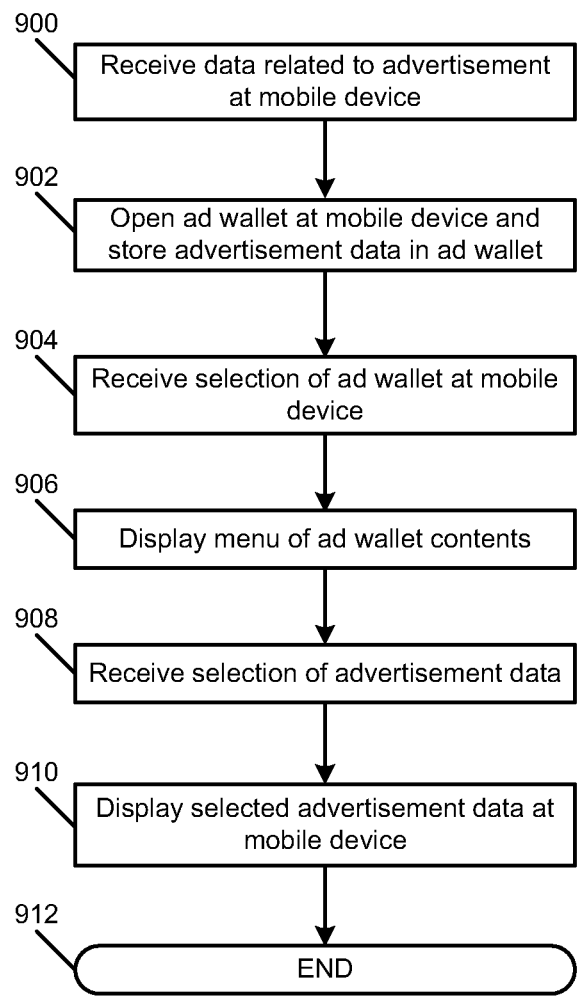
FIG. 9 is a flow diagram illustrating a particular embodiment of a method of receiving advertisement data at a mobile device at a mobile device.

FIG. 9 illustrates a particular embodiment of a method of receiving advertisement data at a mobile device. At block 900, a mobile device receives data related to an advertisement from an ad data management system. Moving to block 902, the mobile device opens an ad wallet folder in response to receiving the data. In one embodiment, the data related to the advertisement can include tags or other data indicating that the data is advertisement-related. The mobile device stores the data related to the advertisement in association with the ad wallet folder.

Proceeding to block 904, the mobile device receives a selection of the ad wallet folder. Continuing to block 906, the mobile device displays a menu of the contents of the ad wallet folder. Advancing to block 908, the mobile device receives a selection of the data related to the advertisement. At block 910, the mobile device displays the data related to the selected advertisement. The method terminates at 912.

Figure 10:
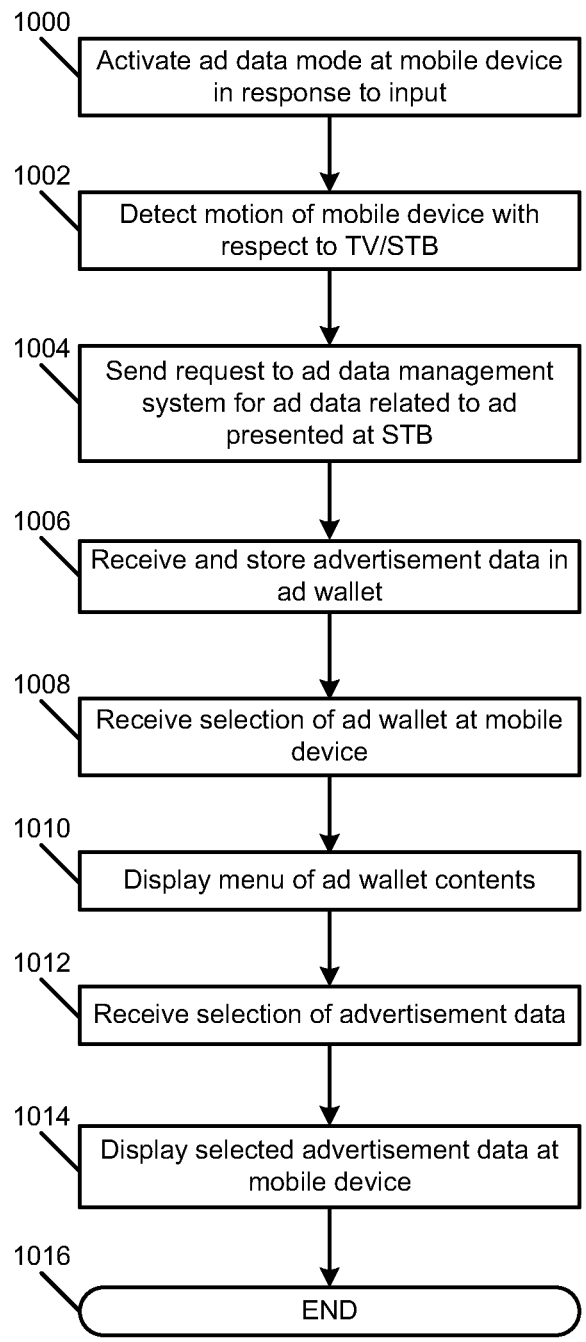
FIG. 10 is a flow diagram illustrating a second particular embodiment of a method of receiving advertisement data at a mobile device at a mobile device.

FIG. 10 illustrates a second particular embodiment of a method of receiving advertisement data at a mobile device. At block 1000, a mobile device activates an ad data mode in response to user input. Moving to block 1002, the mobile device detects a particular motion with respect to a television, set-top box device, other visible object or landmark, or a combination thereof. For instance, the mobile device can determine via a camera that the mobile device has been moved in a particular direction or combination of directions with respect to the visible object or landmark. Proceeding to block 1004, in response to detecting the particular motion, the mobile device sends a request to an ad data management system for advertisement data related to an advertisement presented at a set-top box device associated with the mobile device.

Continuing to block 1006, the mobile device receives data related to an advertisement from the ad data management system. The mobile device stores the data related to the advertisement in association with the ad wallet folder. Proceeding to block 1008, the mobile device receives a selection of the ad wallet folder. Continuing to block 1010, the mobile device displays a menu of the contents of the ad wallet folder. Advancing to block 1012, the mobile device receives a selection of the data related to the advertisement. At block 1014, the mobile device displays the data related to the selected advertisement. The method terminates at 1016.

Figure 11:
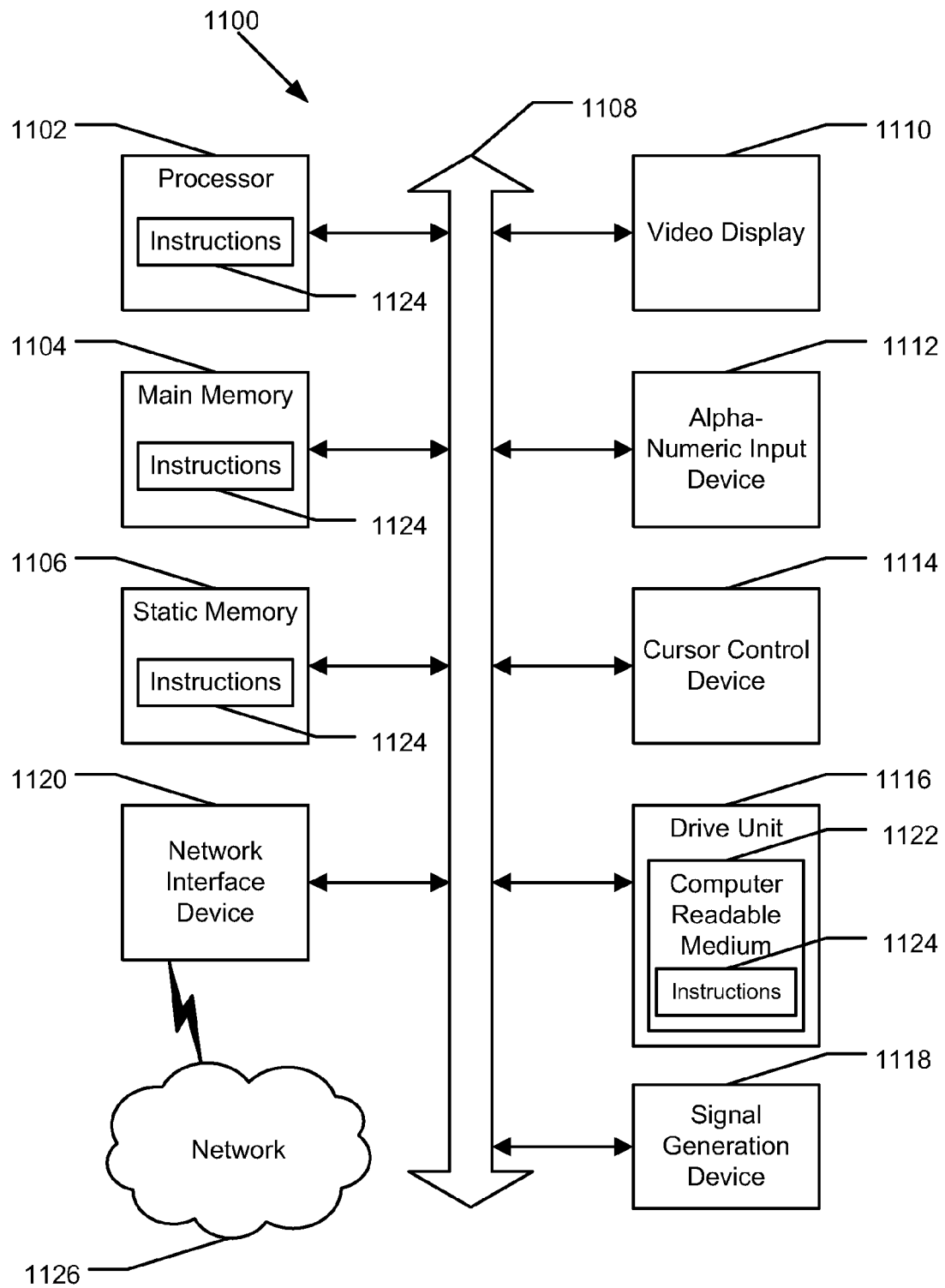
FIG. 11 is a block diagram of an illustrative embodiment of a general computer system.

FIG. 11 shows an illustrative embodiment of a general computer 1100 including a set of instructions that can be executed to cause the computer system to perform any one or more of the methods or computer based functions disclosed herein. The computer system 1100 may operate as a standalone device or may be connected, e.g., using a network, to other computer systems or peripheral devices. In an illustrative embodiment, such standalone and peripheral devices can include, for example, set-top box devices, mobile devices, servers, other network elements, or any combination thereof, as illustrated in FIGS. 1-3.

In a networked deployment, the computer system may operate in the capacity of a server or as a client user computer in a server-client user network environment, or as a peer computer system in a peer-to-peer (or distributed) network environment. The computer system 1100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1100 can be implemented using electronic devices that provide voice, video or data communication. Further, while a single computer system 1100 is illustrated, the term "system" shall also be taken to include any collection of systems or sub-systems that individually or jointly execute a set, or multiple sets, of instructions to perform one or more computer functions.

The computer system 1100 may include a processor 1102, e.g., a central processing unit (CPU), a graphics processing unit (GPU), or both. Moreover, the computer system 1100 can include a main memory 1104 and a static memory 1106 that can communicate with each other via a bus 1108. As shown, the computer system 1100 may further include a video display unit 1110, such as a liquid crystal display (LCD), an organic light emitting diode (OLED), a flat panel display, a solid state display, or a cathode ray tube (CRT). Additionally, the computer system 1100 may include an input device 1112, such as a keyboard, and a cursor control device 1114, such as a mouse. The computer system 1100 can also include a disk drive unit 1116, a signal generation device 1118, such as a speaker or remote control, and a network interface device 1120.

In a particular embodiment as depicted in FIG. 11, the disk drive unit 1116 may include a computer-readable medium 1122 in which one or more sets of instructions 1124, e.g. software, can be embedded. Further, the instructions 1124 may embody one or more of the methods or logic as described herein. In a particular embodiment, the instructions 1124 may reside completely, or at least partially, within the main memory 1104, the static memory 1106, and/or within the processor 1102 during execution by the computer system 1100. The main memory 1104 and the processor 1102 also may include computer-readable media. The network interface device 1120 can provide connectivity to a network 1126, e.g., a wide area network (WAN), a local area network (LAN), or other network.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 1124 or receives and executes instructions 1124 responsive to a propagated signal, so that a device connected to a network 1126 can communicate voice, video or data over the network 1126. Further, the instructions 1124 may be transmitted or received over the network 1126 via the network interface device 1120.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure.

Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method of delivering advertisement data to a mobile device, the method comprising:
   receiving, by a set-top box comprising a processor, a request to register a particular cellular mobile communication device, wherein the particular cellular mobile communication device is configured for voice communications with other cellular mobile communication devices;
   receiving, by the set-top box, registration information associated with the particular cellular mobile communication device;
   sending, by the set-top box, the registration information to an advertisement data management system for storage in a registry of cellular mobile communication devices associated with the set top box;
   receiving, by the set-top box, video content associated with an advertisement, wherein the video content is received via an access network of a video distribution system;
   providing video content associated with the advertisement to a display device coupled to the set-top box to display the advertisement;
   receiving, by the set-top box, a first advertisement selection command;
   providing, by the set-top box, a graphical menu of a plurality of advertisements to the display device in response to the receiving of the first advertisement selection command;
   receiving, by the set-top box, via the graphical menu a second advertisement selection command identifying a selected advertisement of the plurality of advertisements, wherein the second advertisement selection command indicates that metadata related to the selected advertisement is to be sent to the particular cellular mobile communication device associated with the set-top box;
   extracting, by the set-top box, metadata from the video content corresponding to the selected advertisement responsive to receiving the second advertisement selection command; and
   sending, by the set-top box, the metadata to the advertisement data management system via the access network;
   receiving, by the set-top box, data from the advertisement data management system indicating that a plurality of cellular mobile communication devices are registered with the set-top box;
   providing, by the set-top box, a graphical menu to the display device identifying the plurality of cellular mobile communication devices registered with the set-top box;
   receiving, by the set-top box, a selection via the graphical menu of a selected cellular mobile communication device of the plurality of cellular mobile communication devices; and
   sending, by the set-top box, an identification of the selected cellular mobile communication device to the advertisement data management system, to cause the advertisement data management system to deliver a mobile version of the advertisement to the selected cellular mobile communication device via a cellular mobile communication network, wherein the selected cellular mobile communication device stores the mobile version of the advertisement that was displayed on the display device by the set-top box, for display by the selected cellular mobile communication device.

2. The method of claim 1, wherein one of the first advertisement selection command, the second advertisement command, or a combination thereof is received via a remote controller in communication with the set top box, wherein the registration information includes an identifier for use in establishing communications with the particular mobile device, and wherein the registration information and the metadata are configured to enable the advertisement data management system to retrieve a different version of the advertisement that is adapted for presentation on mobile voice communication devices.

3. The method of claim 1, wherein the graphical menu of a plurality of advertisements includes selectable indicators of advertisements received at the set-top box within a particular period of time prior to receipt of the first advertisement selection command at the set-top box.

4. The method of claim 1, further comprising sending program information to the advertisement data management system, wherein the program information includes one of a channel, a time, a television program, or any combination thereof.

5. The method of claim 1, further comprising:
receiving metadata with the video content, wherein the metadata includes data related to the advertisement; and
sending the metadata related to the advertisement to the advertisement data management system with contact information related to the particular mobile device.

6. A set-top box device, comprising:
processing logic; and
a memory accessible to the processing logic, the memory to store instructions, which when executed by the processing logic, cause the processing logic to perform operations comprising:
receiving a request to register a particular mobile device;
receiving registration information associated with the particular mobile device;
sending the registration information to an advertisement data management system for storage in a registry of mobile devices associated with the set top box;
receiving video content associated with an advertisement, wherein the video content is received via an access network of a video distribution system;
providing video content associated with the advertisement to a display device coupled to the set-top box device to display the advertisement;
receiving a first advertisement selection command;
providing a graphical menu of a plurality of advertisements to the display device in response to the receiving of the first advertisement selection command;
receiving via the graphical menu a second advertisement selection command identifying a selected advertisement of the plurality of advertisements,
wherein the second advertisement selection command indicates that metadata related to the advertisement is to be sent to the particular mobile device associated with the set-top box device;
extracting metadata from the video content corresponding to the selected advertisement responsive to receiving the second advertisement selection command;
sending an indication of the second advertisement selection command to the advertisement data management system via the access network, in response to the second advertisement selection command;
receiving data from the advertisement data management system indicating that a plurality of mobile devices are registered with the set-top box;
providing a graphical menu to the display device identifying the plurality of mobile devices registered with the set-top box device;
receiving a selection via the graphical menu of a selected mobile device of the plurality of mobile devices; and
sending an identification of the selected mobile device to the advertisement data management system, to cause the advertisement data management system to deliver a mobile version of the advertisement to the selected mobile device via a mobile communication network, wherein the selected mobile device stores the mobile version of the advertisement that was displayed on the display device by the set-top box, for display by the selected mobile device.

7. The set-top box device of claim 6, the operations further comprising calling an ad-to-go application in response to the second advertisement selection command, the ad-to-go application executable by the processing logic to send one of the indication of the second advertisement selection command, program information, data related to the advertisement, or any combination thereof, to the advertisement data management system, and wherein the registration information and the metadata are configured to enable the advertisement data management system to retrieve a different version of the advertisement that is adapted for presentation on mobile voice communication devices.

8. The set-top box device of claim 7, wherein the ad-to-go application is executable by the processing logic to extract the data related to the advertisement from metadata received with the video content, and wherein the particular mobile device is configured for voice communications with other communication devices.

9. The set-top box device of claim 7, wherein the ad-to-go application is stored at the set-top box device.

10. The set-top box device of claim 7, wherein the ad-to-go application is stored at one of the advertisement data management system or an application server accessible to the set-top box device via the access network.

11. The set-top box device of claim 7, wherein the data related to the advertisement includes one of an electronic coupon, an electronically readable code, a mobile version of the advertisement, information related to an offer associated with the advertisement, information related to an event associated with the advertisement, or any combination thereof.

12. A non-transitory machine-readable medium having processor-readable instructions that are executable by a processor to perform a method, the method comprising:
receiving registration information at an advertisement data management system for storage in a registry of mobile devices associated with a set-top box device, wherein the registration information corresponds to a mobile device that is adapted to enable voice communications with other communication devices, and wherein the registration information is received by the advertisement data management system from the set-top box device responsive to a request to register the mobile device that is received at the set-top box device;
receiving an indication of an advertisement selection command from the set-top box device at the advertisement data management system, wherein the advertisement selection command indicates that metadata related to a selected advertisement of a plurality of advertisements received at the set-top box device and presented by a display coupled to the set-top box device, wherein the display provides a graphical menu of the plurality of advertisements, and the selected advertisement is to be sent to the mobile device associated with the set-top box device;
sending the metadata related to the advertisement from the advertisement data management system to the mobile device in response to the indication;
sending data to the set-top box indicating a plurality of mobile devices registered with the set-top box;
receiving an identification of a selected mobile device of the plurality of mobile devices, wherein the identification is made from the set-top box, the identification being based on a selection at the set-top box from a graphical menu of the data indicating the plurality of mobile devices registered with the set-top box; and
delivering a mobile version of the advertisement to the selected mobile device via a mobile communication network, wherein the selected mobile device stores the mobile version of the advertisement that was displayed on the display by the set-top box, for display by the selected mobile device.

13. The non-transitory machine-readable medium of claim 12, wherein the method further comprises:
receiving program information from the set-top box device; and identifying the advertisement based on the program information.

14. The non-transitory machine-readable medium of claim 13, wherein the method further comprises retrieving data related to the advertisement from an advertisement data database, and wherein the registration information and the metadata are configured to enable the advertisement data management system to retrieve a different version of the advertisement that is adapted for presentation on mobile voice communication devices.

15. The non-transitory machine-readable medium of claim 12, wherein the method further comprises receiving the metadata related to the advertisement from the set-top box device, and wherein the metadata is associated with a bar code.

* * * * *